(12) United States Patent
Kamijo et al.

(10) Patent No.: US 8,020,770 B2
(45) Date of Patent: Sep. 20, 2011

(54) DISPLAY METHOD AND DISPLAY APPARATUS

(75) Inventors: Noboru Kamijo, Kanagawa-ken (JP);
Koichi Komijoh, Kanagawa-ken (JP);
Kazumasa Ochiai, Kanagawa-ken (JP);
Yasuo Usuba, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 650 days.

(21) Appl. No.: 12/064,833

(22) PCT Filed: Aug. 30, 2006

(86) PCT No.: PCT/JP2006/317120
§ 371 (c)(1),
(2), (4) Date: Feb. 26, 2008

(87) PCT Pub. No.: WO2007/029582
PCT Pub. Date: Mar. 15, 2007

(65) Prior Publication Data
US 2010/0008600 A1    Jan. 14, 2010

(30) Foreign Application Priority Data

Sep. 7, 2005  (JP) .................................. 2005-259725

(51) Int. Cl.
*G06K 7/14*    (2006.01)
*G06K 19/06*    (2006.01)

(52) U.S. Cl. ...................................... 235/454; 235/494

(58) Field of Classification Search .................. 235/454, 235/494, 375, 462.1, 462.11, 462.02, 472.01–472.03; 434/315, 317
See application file for complete search history.

(56) References Cited

U.S. PATENT DOCUMENTS 5,593,349 A * 1/1997 Miguel et al. .................... 463/30
5,862,243 A * 1/1999 Baker et al. .................... 382/101
(Continued)

FOREIGN PATENT DOCUMENTS

JP    08-095993 A    4/1996
(Continued)

OTHER PUBLICATIONS

Email from TC 2800 101 Help Panel regarding 101 rejection of claim 44, Oct. 22, 2010.*

(Continued)

*Primary Examiner* — Michael G Lee
*Assistant Examiner* — Suezu Ellis
(74) *Attorney, Agent, or Firm* — Schmeiser, Olsen & Watts; John Pivnichny

(57) ABSTRACT

A display method and display apparatus. Shooting a physical medium generates a captured image from the physical medium. An image pattern on the physical medium, which includes an identification code and binary indicators, is scanned. The identification code identifies a location on a storage medium of at least one image object. Each binary indicator is associated with a corresponding status parameter and has a positive value or a null value. At least one status parameter value is acquired and has a status parameter value for each status parameter whose binary indicator has the positive value. A display object is generated in dependence on the location appearing in the identification code and the acquired at least one status parameter value. The display object and the captured image are displayed, on a display unit of the display apparatus, in an overlapping relationship in which the display object overlaps the captured image.

25 Claims, 12 Drawing Sheets

U.S. PATENT DOCUMENTS

| | | | | | |
|---|---|---|---|---|---|
| 5,899,700 | A | * | 5/1999 | Williams et al. | 434/308 |
| 6,102,289 | A | * | 8/2000 | Gabrielson | 235/462.01 |
| 6,389,182 | B1 | | 5/2002 | Ihara et al. | |
| 6,661,433 | B1 | * | 12/2003 | Lee | 715/764 |
| 6,894,243 | B1 | * | 5/2005 | Avant et al. | 209/584 |
| 7,085,693 | B2 | * | 8/2006 | Zimmerman | 703/6 |
| 7,156,311 | B2 | | 1/2007 | Attia et al. | |
| 7,198,194 | B2 | * | 4/2007 | Kim et al. | 235/462.09 |
| 7,661,601 | B2 | * | 2/2010 | Takano et al. | 235/494 |
| 7,692,630 | B2 | * | 4/2010 | Natsume et al. | 345/158 |
| 2003/0097441 | A1 | | 5/2003 | Konomi | |
| 2005/0149399 | A1 | | 7/2005 | Fukunaga et al. | |
| 2009/0124195 | A1 | * | 5/2009 | Kamijoh et al. | 455/3.06 |

FOREIGN PATENT DOCUMENTS

| | | |
|---|---|---|
| JP | 2000-032306 | 1/2000 |
| JP | 2002-082963 | 3/2002 |
| JP | 2002-366566 | 12/2002 |
| JP | 2004-040281 | 2/2004 |
| JP | 2004-274550 | 9/2004 |
| JP | 2004-535000 | 11/2004 |
| JP | 2005-031916 B | 2/2005 |
| JP | 2005-167330 | 6/2005 |
| JP | 2005-215178 | 8/2005 |
| JP | 2005-143657 | 9/2005 |

OTHER PUBLICATIONS

Michael Rohs Ed-Hitomi Murakami et al., "Real-World Interaction with Camera Phones", Ubiquitous Computing Systems; [Lecture Notes in Computer Science; LNCS], Springer-Verlag, Berlin/Heidelberg, vol. 3598, Aug. 24, 2005; pp. 74-89; XP019012923.

QR Code.com; QR Code features; http://www.denso-wave.com/qrcode/qrfeature-e.html; 2 pages, 2003.

Junichi Rekimoto; Trend in Research On the Real World-Oriented Interface; a tutorial introduction to computer augmented environments; Sony Computer Science Laboratory Inc., vol. 13, No. 3 (1996); pp. 4-18.

* cited by examiner

DISPLAY METHOD AND DISPLAY APPARATUS

DETAILED DESCRIPTION OF THE INVENTION

1. Field of the Invention

The present invention relates to a display apparatus, an output device, a display system, a display method, a medium, a program product, and an external unit. The present invention relates particularly to a display apparatus that scans an image pattern to display an outputted image according to the image pattern thus scanned, a display system, a display method, a medium a program product, and an external unit.

2. Background Art

A code image, such as QR code (ISO/IEC18004), has conventionally been used (for example, refer to Non-patent Document 1.). The code image is used to acquire an address (URL) into a cell phone or the like in accessing, for example, the Internet. When accessing an address on the Internet, which is displayed using the code image, the personal digital assistant captures an image of the code image with a built-in camera, and decodes the captured image. The personal digital assistant then accesses the address on the Internet, which is designated with a code obtained by the decoding, to display a screen of an Internet site. Making use of the code image like this makes it possible to eliminate the time and effort of entering the address with keys. For that reason, the code image is suitable to be used for displaying an advertisement for the user's personal digital assistant.

Meanwhile, as a reference technique, there is proposed such a camera that, music data recorded upon shooting an image is overlapped with the image obtained by that shooting, and printed with a special ink that is not normally visible (for example, refer to Patent Document 1.).

[Patent Document 1]
Japanese Unexamined Patent Publication (Kokai) No.
[Non-patent Document 1]
Feature of QR code, homepage URL "http://www.denso-wave.com/qrcode/qrfeature.html", searched on Aug. 11, 2005

DISCLOSURE OF THE INVENTION

Problems to be Solved by the Invention

In a conventional art, when image information designated by a code image is displayed, it is general that a display image is uniquely determined according to the code image to be scanned. As a result, an unsuitable image may be displayed depending on a user's situation.

Therefore, the object of the present invention is to provide a display apparatus, an output device, a display system, a display method, a medium, a program product, and an external unit, which can solve the aforementioned problems. The object will be achieved by combinations of features set forth in independent claims in the scope of claims. In addition, dependent claims define more advantageous, specific examples of the present invention.

Means for Solving the Problems

In order to solve the aforementioned problems, according to a first aspect of the present invention, there is provided a display apparatus including a scanning unit for scanning an image pattern on a physical medium, an acquisition unit for acquiring at least one status parameter of an external environment acquired by an environmental sensor, a decision unit for determining a display object to be presented to a user based on the image pattern scanned by the scanning unit according to the status parameter acquired by the acquisition unit, and a display unit for displaying the display object thus determined by the decision unit, and also a display system including the display apparatus, a display method, and a program product for causing an information processing apparatus to operate as the display apparatus.

Moreover, according to a second aspect of the present invention, there is provided an output device including a scanning unit for scanning information, an acquisition unit for acquiring at least one status parameter indicative of a status of an external environment, a generating unit for generating output data according to the information scanned by the scanning unit and the status parameter acquired by the acquisition unit, and an output unit for outputting the output data generated by the generating unit to a user.

Moreover, according to a third aspect of the present invention, there is provided a medium with an image pattern including a code indicative of information to be presented to a user attached thereto, wherein the code includes information for designating a type of a status parameter of an external environment to be acquired by an apparatus operable to present the information indicated by the code to the user, and wherein the medium permits the apparatus, which has scanned the image pattern, to acquire the type of the status parameter of the external environment and to display the display object according to the status parameter.

Moreover, according to a fourth aspect of the present invention, there is provided an external unit to be attached to an information processing apparatus including an acquisition unit for acquiring at least one status parameter of an external environment acquired by an environmental sensor, and a program memory operable to store a program product for causing the information processing apparatus to operate as a display apparatus, wherein the program memory stores a program product for causing the information processing apparatus, to which the external unit is being attached, to operate as a scanning unit for scanning an image pattern on a physical medium, an acquisition unit for acquiring at least one status parameter of an external environment acquired by an environmental sensor, a decision unit for determining a display object to be presented to a user based on the image pattern scanned by the scanning unit according to the status parameter acquired by the acquisition unit, and the display unit for displaying the display object thus determined by the decision unit.

Note herein that, the aforementioned summary of the invention does not enumerate all of the necessary features of the present invention, and sub-combinations of these features may be the inventions.

Advantages of the Invention

According to the present invention, the most suitable image according to the environment can be displayed to the user.

BEST MODE FOR CARRYING OUT THE INVENTION

Hereinafter, the present invention will be described through embodiments of the invention, but the following embodiments do not limit the invention according to the claims, and any combinations of features described in the embodiments are not essential in order to solve problems of the invention.

FIG. 1 illustrates an entire configuration of a display system 1. The display system 1 includes a physical medium 20 on which a code image 10 is attached, and a display apparatus 30. The physical medium 20 is a magazine in the present embodiment, or alternatively, it may be goods having a surface on which the code image 10 can be attached, for example, a newspaper, an electric appliance, a wall, or the like. The code image 10 is attached on the surface of the physical medium 20 by printing or the like, and is an image including a code indicative of the information to be supplied to a user. The code image 10 may be an image that the user cannot visually recognize in the state of being attached onto the physical medium 20. For example, the code image 10 is printed with a special ink, which does not display the image under a normal light, but displays a light image under a predetermined light, such as infrared light or ultraviolet light, and is not visible with human being's eyes, but may be shot by irradiating an auxiliary light, such as infrared light or ultraviolet light. Such the code image 10 is an example of an image pattern in accordance with the present invention.

The display apparatus 30 scans the code image 10 and displays a display object according to contents thus scanned.

FIG. 2 shows an example of the code image 10 in which information showing the information to be supplied to the user is indicated with a QR code.

The code image 10 includes an identification code for designating a storage location of an image to be displayed to the user, a type of the image or image object on a storage medium, or the like. Additionally, the code image 10 may include attribution information for designating a type of a status parameter of an external environment to be acquired by the display apparatus 30 that has scanned the code image 10.

Here, the status parameter of the external environment is information indicative of a status of the external environment of the display apparatus 30, and specifically, it is information, such as a time in acquisition, a date in acquisition, a day of the week in acquisition, a latitude and a longitude of the display apparatus, a brightness around the display apparatus, a temperature outside the display apparatus, a humidity outside the display apparatus, an acceleration applied to the display apparatus, a sound around the display apparatus, an orientation of the display apparatus, an atmospheric pressure around the display apparatus, or the like. The attribution information includes information for designating at least one of these status parameters. An originator of the code image 10 can arbitrarily designate any combinations of the status parameters to be acquired by the display apparatus 30 with the code image 10. Note herein that, the code image 10 is not limited to the QR code, but may be a bar code or the other two-dimensional code. In summary, the code image 10 may comprise an identification code, a type of each image object, and binary indicators. The identification code identifies a location on a storage medium of each image object. Each binary indicator is associated with a corresponding status parameter and each binary indicator has a positive value (e.g., "1" in FIG. 2) or a null value (e.g., "0" in FIG. 2). In FIG. 2, the binary indicator of the status parameters of brightness, temperature, and date & time has the positive value of "1", and the binary indicator of the status parameters of sound, acceleration, position, humidity, and day of week has the null value of "0".

FIG. 3 shows a configuration of the display apparatus 30. The display apparatus 30 includes a shooting unit 31, a scanning unit 32, an acquisition unit 33, a decision unit 34, a database 35, and a display unit 36.

The shooting unit 31 shoots an object to be shot and generates a captured image. The shooting unit 31 supplies the captured image to the decision unit 34. The scanning unit 32 scans the code image 10. The scanning unit 32 supplies the code image 10 thus scanned to the decision unit 34.

The acquisition unit 33 acquires one or a plurality of status parameters designated by the decision unit 34 and supplies the acquired status parameter to the decision unit 34. The acquisition unit 33 includes an environmental sensor 37, a timer unit 38, and a GPS unit 39, for example. The acquisition unit 33 acquires output values from the environmental sensor 37, the timer unit 38, and the GPS unit 39. The environmental sensor 37 measures, for example, the brightness around the display apparatus 30, the external temperature, the external humidity, the acceleration, the sound, the orientation, the atmospheric pressure, the smell, or the like. The timer unit 38 outputs the time, the date, and the day of the week. The GPS unit 39 outputs the latitude and the longitude of the display apparatus 30.

The decision unit 34 determines the display object to be presented to the user based on the code image 10 supplied from the scanning unit 32, according to the status parameter acquired by the acquisition unit 33. The database 35 manages data serving as a base of the display object generated by the decision unit 34. The display unit 36 displays the display object generated by the decision unit 34.

FIG. 4 shows a flow chart of the process of the display apparatus 30.

First, the display apparatus 30 scans the code image 10 according to a user's operation (Step S10). Subsequently, the decision unit 34 determines whether or not the scanned code image 10 is larger than a standard size (Step S11). If the scanned code image 10 is larger than the standard size, the decision unit 34 proceeds to Step S12, and if not, it proceeds to Step S17. The decision unit 34 decodes the code image 10 scanned by the scanning unit 32, and recognizes the identification code and the attribution information included in the code image 10 (Step S12). Subsequently, the decision unit 34 issues an acquisition request of one or a plurality of status parameters designated by the attribution information, to the acquisition unit 33 (Step S13). Subsequently, the acquisition unit 33 acquires the status parameter in response to the request from the decision unit 34, and transmits the acquired status parameter value to the decision unit 34 (Step S14). The acquired status parameter in step S14 is a status parameter value of the status parameter. For example, if the status parameter is the temperature outside the display apparatus, then Step S14 acquires a value of the temperature outside the display apparatus.

Subsequently, the decision unit 34 extracts the identification code included in the code image 10 and the image information specified by the acquired status parameter, by retrieving the database 35 (Step S15). Subsequently, the decision unit 34 generates the display object based on the extracted image information (Step S16). For example, the decision unit 34 generates the display object, by treating and changing the image specified by the identification code, according to the acquired status parameter. Meanwhile, when a plurality of images are allocated to one identification code to be managed, the decision unit 34 selects any one image among the images currently allocated according to the status parameter, and generates the display object based on the selected image. Subsequently, the display unit 36 displays the display object generated by the decision unit 34 and the captured image generated by the shooting unit 31 to the user in such a manner that the former overlaps with the latter (Step S17). Incidentally, if it is determined at Step S11 that the code image 10 is smaller than the standard size, the captured image is displayed as it is (Step S17).

According to this display system 1, the optimum image according to the external environment of the display apparatus 30 can be displayed to the user. Incidentally, the decision unit 34 may display the display object independently.

FIG. 5 shows a block diagram of an information processing apparatus 40 serving as the display apparatus 30. The information processing apparatus 40 includes a camera unit 41, a processor 43, a monitor 44, a key 45, a communication unit 46, a memory unit 47, the environmental sensor 37, the timer unit 38, and the GPS unit 39. The camera unit 41 receives light from the image object to generate the captured image. Additionally, the camera unit 41 receives light from the code image 10 to generate the image data of the code image 10. For example, the camera unit 41 irradiates a fill light, such as ultraviolet light or infrared light, to the code image 10 that the user cannot visually recognize, and receives light emitted by the code image 10 resulting from the irradiation of the fill light to generate the image data. The camera unit 41 includes a lens 52 operable to converge light from the image object and the code image 10, a filter 54 allowing ultraviolet light or infrared light to pass through in the case of shooting the code image 10, an image sensor 56 operable to convert the light which has passed through the filter 54 into electric information, and an irradiation unit 58 operable to irradiate the fill light to the code image 10. This camera unit 41 implements functions of the shooting unit 31 and the scanning unit 32 of the display apparatus 30.

The processor 43 executes a program stored in a RAM 43-1, a ROM 43-2, or the like, and performs control for each unit of the information processing apparatus 40. The processor 43 operates the information processing apparatus 40 as the display apparatus 30 by controlling each unit. The monitor 44 displays the image to the user. The monitor 44 implements a function of the display unit 36 of the display apparatus 30. The key 45 receives an operation input from the user. The communication unit 46 communicates with an external server of the display apparatus 30 or other apparatuses via a network. The memory unit 47 stores the image data to be supplied to the user. The memory unit 47 may be provided inside the display apparatus 30, or may be connected therewith via the communication unit 46 while being provided on a network.

The environmental sensor 37 includes, as one example, a brightness sensor for measuring the brightness around the display apparatus 30, a temperature sensor for measuring the external temperature, a humidity sensor for measuring the external humidity, an acceleration sensor for measuring the acceleration, a sound volume sensor for measuring the sound volume, an orientation sensor for detecting the terrestrial magnetism to measure the orientation, an atmospheric pressure sensor for measuring the atmospheric pressure, a smell sensor for detecting the smell, or the like. The environmental sensor 37 outputs a measured external environment status in response to an acquisition request from the processor 43. The timer unit 38 outputs the current time, the date, and the day of the week in response to the acquisition request from the processor 43. The GPS unit 39 outputs latitude and longitude information at the current position in response to the acquisition request from the processor 43.

The program installed in such an information processing apparatus 40 is provided by the user via a recording medium or a network. The program is executed in the processor 43. The program, which is installed in the information processing apparatus 40 and causes the information processing apparatus 40 to operate as the display apparatus 30, is provided with an image shooting module, a scanning module, an acquisition module, a generating module, a database module, and a display module. These program products or modules work with the processor 43 or the like, and causes the information processing apparatus 40 to operate as the shooting unit 31, the scanning unit 32, the acquisition unit 33, the decision unit 34, the database 35, and the display unit 36, respectively.

The program or modules shown above may be stored in an external storage medium. As the storage medium, other than a flexible disk and a CD-ROM, an optical recording medium such as DVD, CD, or the like, a magneto optic recording medium such as MO or the like, a tape medium, a semiconductor memory such as an IC card or the like may be used. Moreover, the memory apparatus such as a hard disk, a RAM, or the like, provided in a server system connected to a private telecommunication network or the Internet may be used as the recording medium to provide the program to the information processing apparatus 40 via the network.

FIGS. 6 and 7 show an advertisement system, which is one of application examples of the display system 1. Note herein that, in FIGS. 6 and 7, the area surrounded by the dotted line represents a part of a magazine used as the physical medium 20 in this application example. More specifically, in the area surrounded by the dotted line, an article of a beer drink that is a new product is described, and the code image 10 for presenting an advertisement of the beer drink to the user, which is printed with a special ink that cannot be visually recognized by human being's eyes, is also described.

FIG. 6 shows the display unit 36 in the situation before displaying the advertisement. In the case where the magazine as the physical medium 20 is shot, the decision unit 34 of the display apparatus 30 allows the display unit 36 to display the content of the article on the display unit 36, and also a pointer 60 for indicating that advertisement information is present in a position on the display image where the code image 10 is attached. As a result, the display apparatus 30 can make the user recognize the presence of the code image 10. Moreover, when the size of the code image 10 to an angle of field is smaller than a reference size, the decision unit 34 may display the pointer 60 indicative of the presence of the advertisement information. This makes it possible to make the user recognize the presence of the code image 10 even when the content of the code cannot be recognized. Additionally, the decision unit 34 of the display apparatus 30 may display an explanation character string 61 for indicating an operating instruction when the user wants to see the content of the advertisement, along with the pointer 60, on the display unit 36.

FIG. 7 shows the display unit 36 in the situation after displaying the advertisement. In the case where the operation for displaying the advertisement or the like is made by the user while the pointer 60 is being displayed, and so on, the decision unit 34 of the display apparatus 30 acquires a predetermined advertisement image designated by the code image 10 from the database 35 and allows the display unit 36 to display it. In this instance, the decision unit 34 acquires the status parameter and switches the advertisement image to be displayed according to the acquired status parameter. For example, if the advertisement of the beer drink is displayed, the decision unit 34 will acquire the external temperature as the status parameter. As one example, when the atmospheric temperature is high, the decision unit 34 may cause to display foodstuffs, which are delicious to eat in a hot season, with the beer drink, and the background of the beer drink may be set to an image of a summer sea or the like. Meanwhile, when the external temperature is low, the decision unit 34 may cause to display foodstuffs, which are delicious to eat in a cold season, with the beer drink, and the background of the beer drink may be set to an image of the north pole or the like. By switching the advertisement image according to the status parameter like this, the display apparatus 30 can display the advertisement of the most suitable content to the user according to the external environment.

FIG. 8 shows a virtual insect collecting system 70 for providing the user with a pseudo animate thing collecting attraction, which is one of the application examples of the display system 1. The virtual insect collecting system 70 is provided with a building 72 used as the physical medium 20, and the portable display apparatus 30.

The building 72 has therein an attraction space for forming such a pseudo situation that insects can be collected in a forest, a field of grass, or the like. Moreover, inside the building 72, the code image 10 including a code for identifying a type of the insects is attached at a large number of locations where the insects are likely to exist. The user has the display apparatus 30 in its hand, and looks for the insect, with holding up the display apparatus 30 to the location where the insect is likely to exist. While the user is looking for the insect, the display apparatus 30 shoots the environment while irradiating a fill light, such as infrared light. When the code image 10 attached to the attraction space is recognized, the display apparatus 30 will then display a pointer on the display unit 36, or will sound from a speaker to thereby notify the user that the insect has been discovered. When a predetermined capture operation is made by the user after discovering the insect, the display apparatus 30 downloads data regarding the discovered insect from, for example, the database 35 to register them into the internal memory, and displays the image of the insect or the like according to the user's operation after that. As a result, the display apparatus 30 can make the user experience of having caught the insect in pseudo.

Here, when the insect is discovered (when the code image 10 is recognized), the decision unit 34 of the display apparatus 30 changes a type of insects to be displayed according to the status parameter, such as the time, the external brightness, or the like when the insect is discovered. Even when the same code image 10 is recognized, the decision unit 34 generates the display object so that a different insect may be discovered according to external temperature of the display apparatus, the external humidity of the display apparatus, the brightness around the display apparatus, the time, or the like, in scanning the code or the like. Hence, even when the insect is discovered at the same position in the attraction space, the display apparatus 30 makes the different insects appear in the morning and night, makes a very rare insect appear at a certain specific time, or makes different insects appear in summer and winter. Thus, the display system 1 can provide the real virtual insect collecting system 70 that the user can enjoy.

Note herein that, when the insect is caught, the display apparatus 30 may set the caught insect as an object of a training game program, set the caught insect as an object of a fighting game for making it fight with an insect that other user has, set the caught insect as an object of a pseudo specimen of insects by registering it into the database on the network, or set the caught insect as an object of an exchange with other user.

Further in collecting the insect, the decision unit 34 of the display apparatus 30 may switch and display a display object for indicating that the insect has been captured, and a display object for indicating that the insect has been escaped, depending on the status parameter. Moreover, the decision unit 34 may change motion of the insect displayed on the display object according to the status parameter. Moreover, when the display object of the insect has been generated based on the code image 10 of the same type in the past, the decision unit 34 may generate the display object of the insect with a growth degree according to the number of detection times of the code image 10. Moreover, when the code image 10 with the same code as the code image 10 acquired in the past is acquired, or when a code image with the same code is acquired at predetermined times, the decision unit 34 may not generate a display object for displaying the same insect as that displayed according to the code image 10 of the code.

Additionally, a function for managing the display object generated by the decision unit 34 is previously provided in the server on the network. The communication unit 46 of the display apparatus 30 transmits to the server at least one information according to the scanned code image 10, and information according to the display object generated by the decision unit 34. The display apparatus 30 receives from the server information on whether or not the display apparatus 30 or other display apparatus has generated a display object of the same insect based on the same code image 10 in the past. When the display apparatus 30 or other display apparatus has generated the display object of the same insect based on the same code image 10 in the past, the decision unit 34 may not generate the display object for displaying the insect according to the code indicated in the code image 10, or may increase probability of not generating the display object for displaying the insect according to the code indicated in the code image 10. Note herein that, while the virtual insect collecting system 70 has been described as an example of the animate thing collection attraction, the display system 1 may be applied to the collection attraction of other animate things.

FIGS. 9 and 10 show a modification of the virtual insect collecting system 70, using a book 80 as the physical medium 20 on which the code image 10 is attached. FIG. 9 shows a situation before holding up the display apparatus 30 to the book 80, and FIG. 10 shows a situation where the display apparatus 30 is held up to the book 80.

In the example shown in FIGS. 9 and 10, a forest or the like is printed on the book 80 with a normal ink, instead of the structure 72 shown in FIG. 8, and the code image 10 is printed with the special ink thereon. This example makes it possible for the user to freely enjoy the pseudo insect collecting at home or the like.

FIG. 11 shows an appearance of a display apparatus 90 as a modification of the display apparatus 30. Members in the display apparatus 90 having the same symbols as those of the display apparatus 30 have almost the same function and configuration as those of the display apparatus 30 in the display apparatus 90, so description thereof will be omitted hereinafter except for a different point.

The display apparatus 90 includes a main body 92, and an external unit 94. The external unit 94 is detachably fitted in a slot 96 formed in the main body 92. The external unit 94 is electrically connected with the main body 92 when the external unit 94 is fitted in the slot 96, and the display apparatus 90 serves as a display apparatus similar to the display apparatus 30.

FIG. 12 shows a block diagram of the display apparatus 90. The display apparatus 90 has the slot 96 to which the external unit 94 including a program memory 98 and the environmental sensor 37 is connected. The program memory 98 stores a program for causing the information processing apparatus to operate as the display apparatus 90. The program stored in the program memory 98 will be scanned by the processor 43 when the main body 92 is attached thereto. The processor 43 executes the program product thus scanned.

The environmental sensor 37 includes sensors, such as the atmospheric temperature sensor or the humidity sensor, for measuring the status parameter, such as atmospheric temperature, humidity, or the like requested by the program stored in the program memory 98. Since in the display apparatus 90, requested sensors are accommodated in the environmental sensor 37 of the external unit 94, it is possible easily, for example, to add a function for acquiring the status parameter, to change the sensor function by upgrading the program, or the like. Meanwhile, the shooting unit 31 (camera unit 41), the timer unit 38, and the GPS unit 39 may also be incorporated in the external unit 94.

While the embodiments using the code image 10 has been described as an example of the image pattern in accordance with the present invention as above, the image pattern may indirectly include a code using a digital watermark instead of a form in which the code information is directly included. Meanwhile, the display apparatus 30 may take in an image pattern not including the code to thereby perform, according to the status parameter, a processing or a change to the image pattern thus taken. Moreover, while the display apparatus 30 for displaying the image as the embodiment has been described, a sound may be outputted or a character string may be outputted.

Moreover, while the present invention has been described using the embodiments, the technical scope of the present invention is not limited to the scope described in the aforementioned embodiments. It is obvious to those skilled in the art that various modification or improvement may be added to the aforementioned embodiments. It is clear from the description of claims that such aspects to which modification and the improvement are added can also be included in the technical scope of the present invention.

DESCRIPTION OF SYMBOLS

Figure 1:
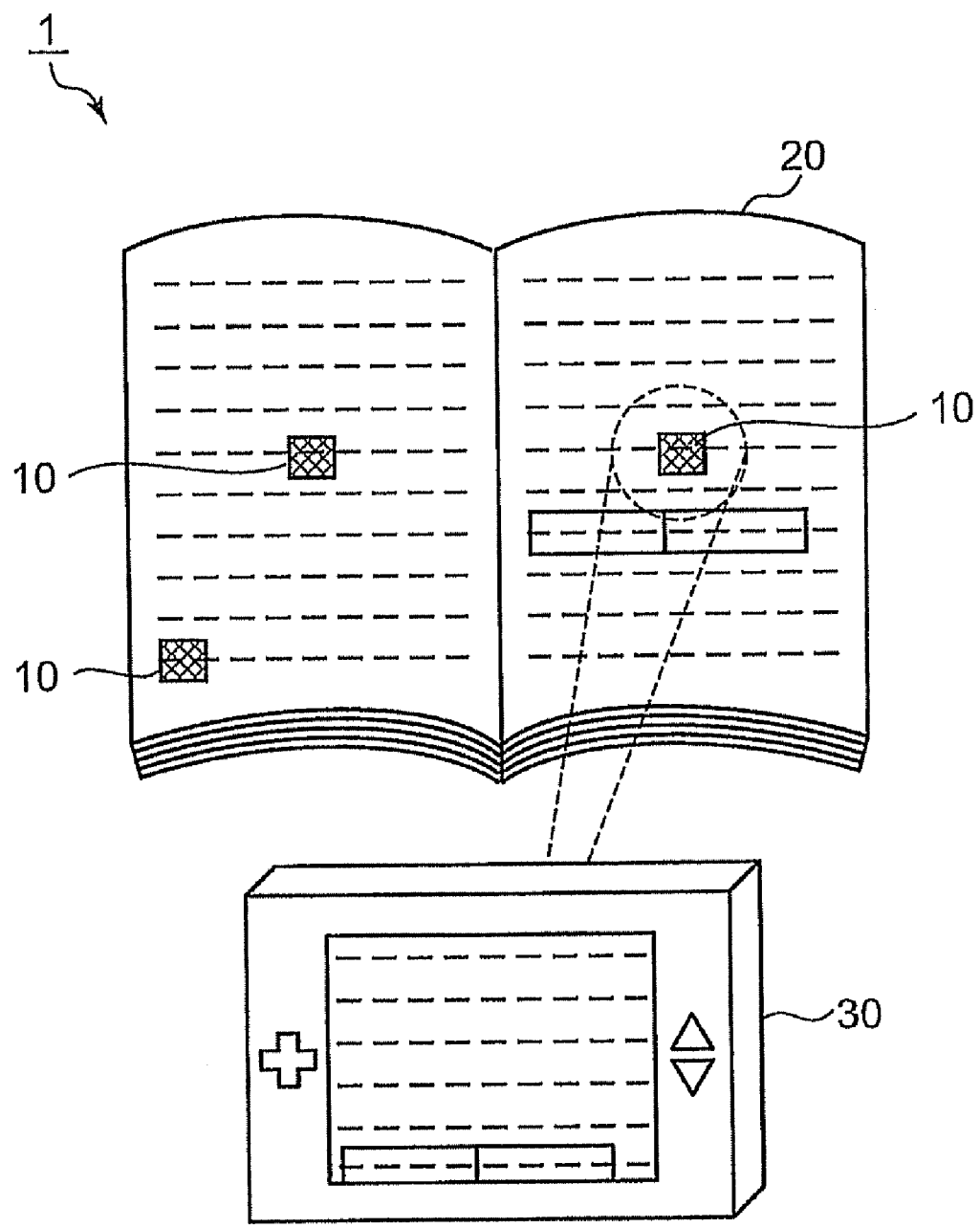
FIG. 1 illustrates an entire configuration of a display system 1 in accordance with an embodiment of the present invention.
Figure 2:
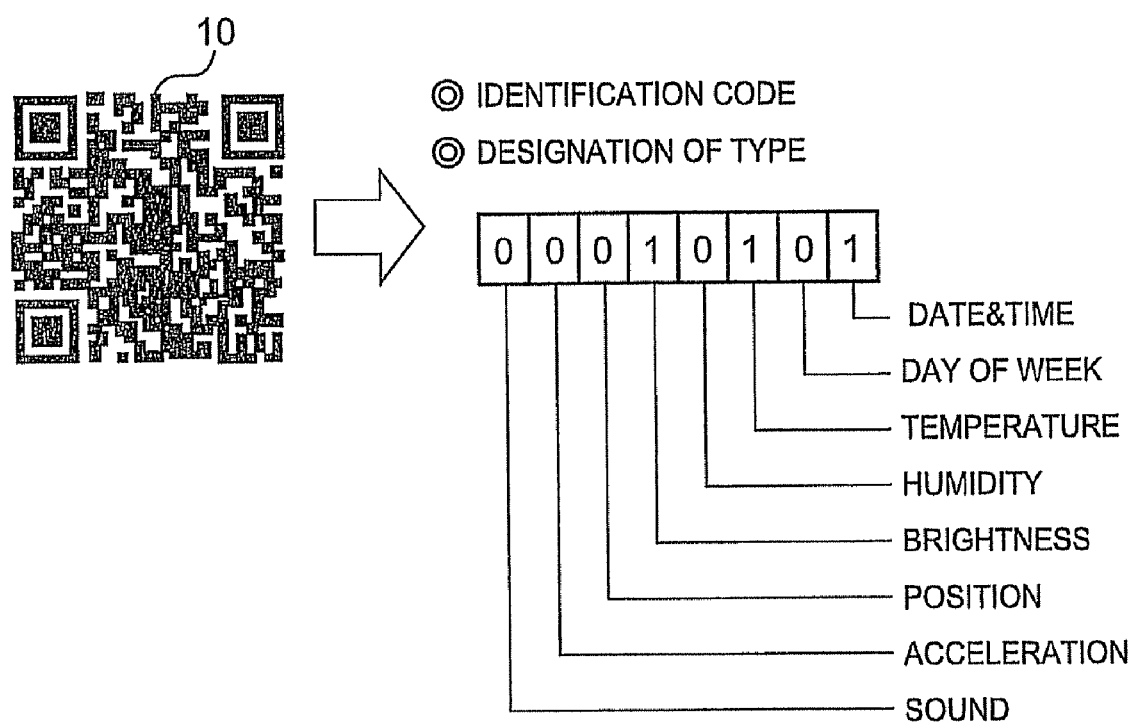
FIG. 2 illustrates a code image 10 represented with a QR code.
Figure 3:
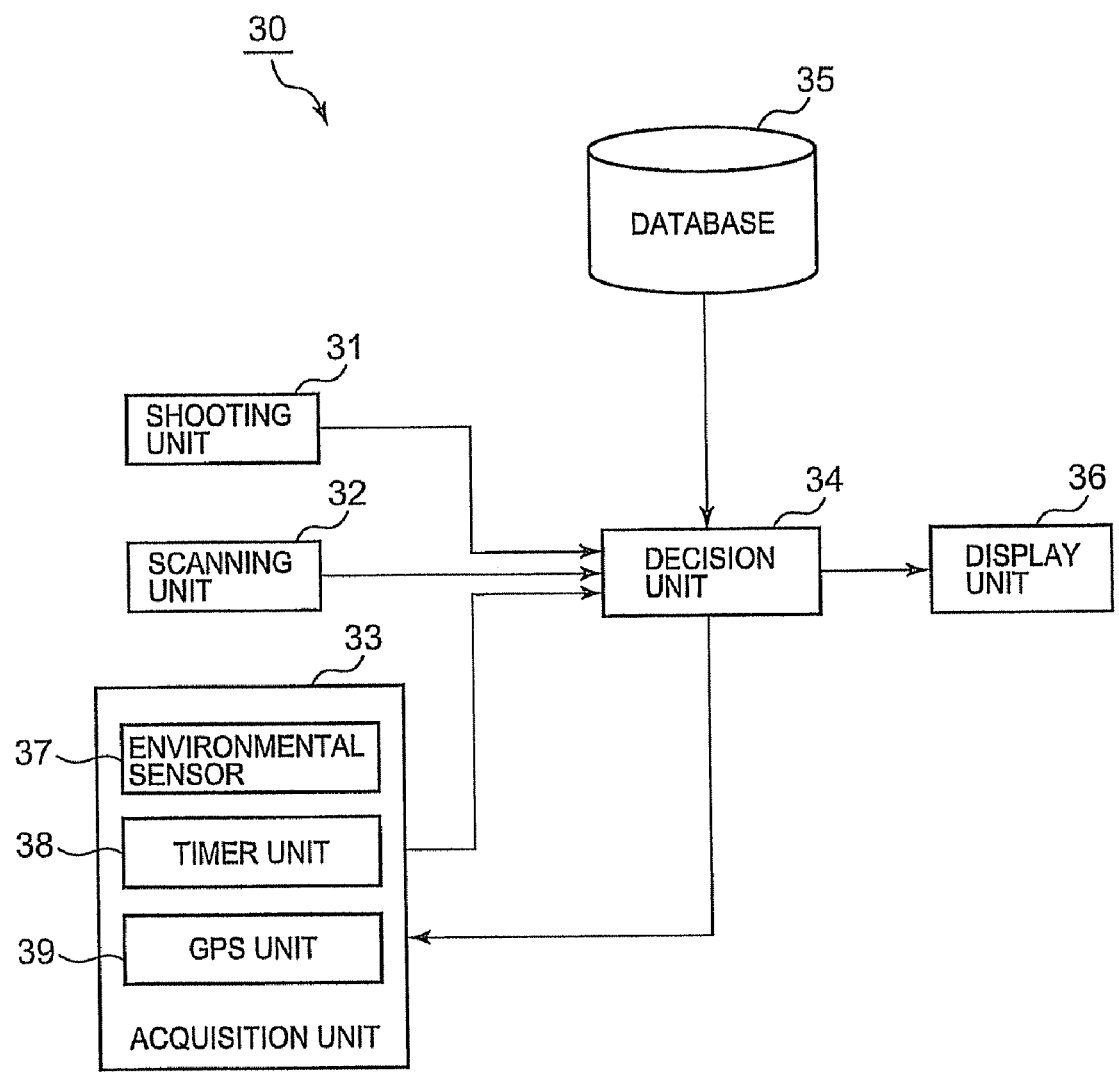
FIG. 3 illustrates a configuration of a display apparatus 30 in accordance with the present embodiment.
Figure 4:
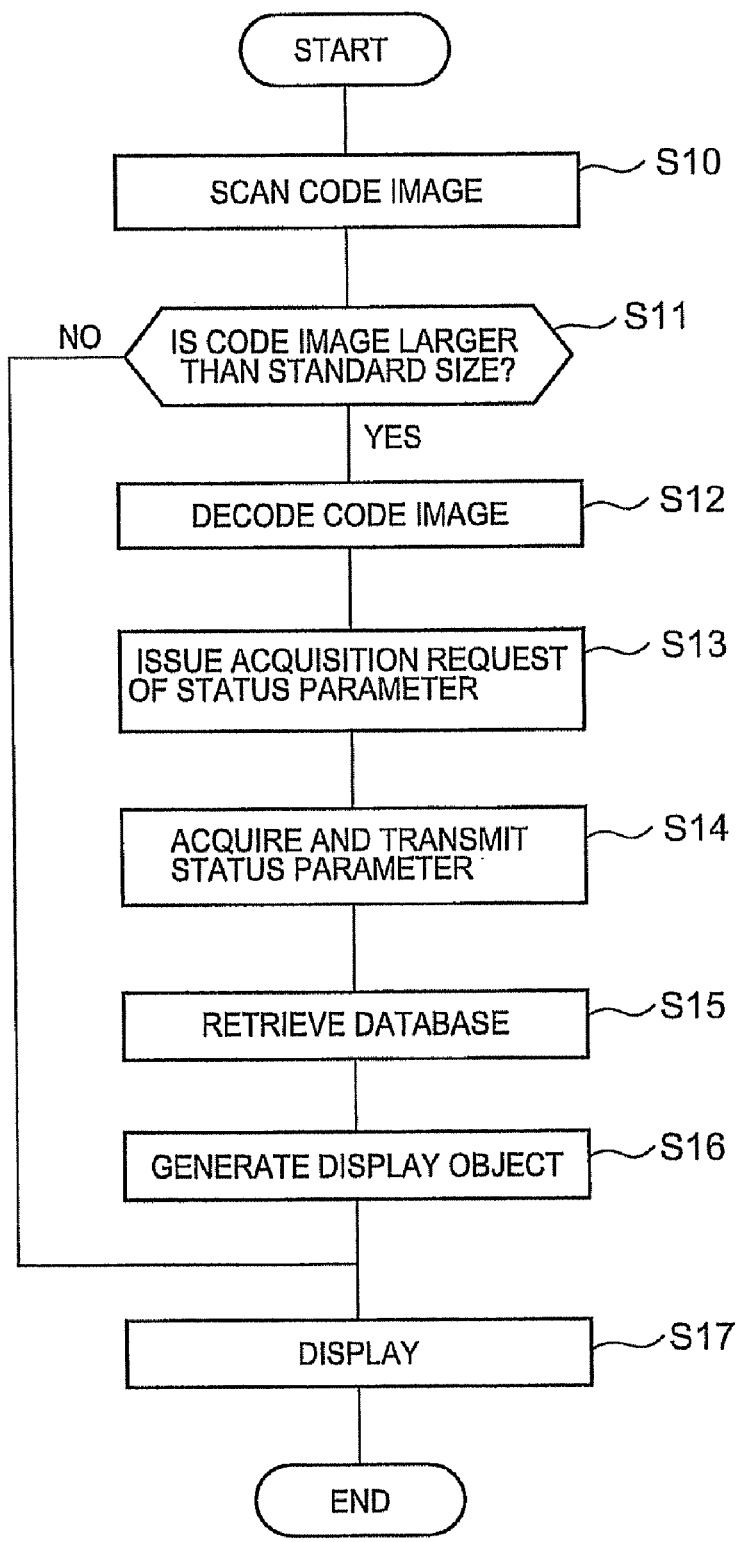
FIG. 4 illustrates a flow chart of the process of the display apparatus 30.
Figure 5:
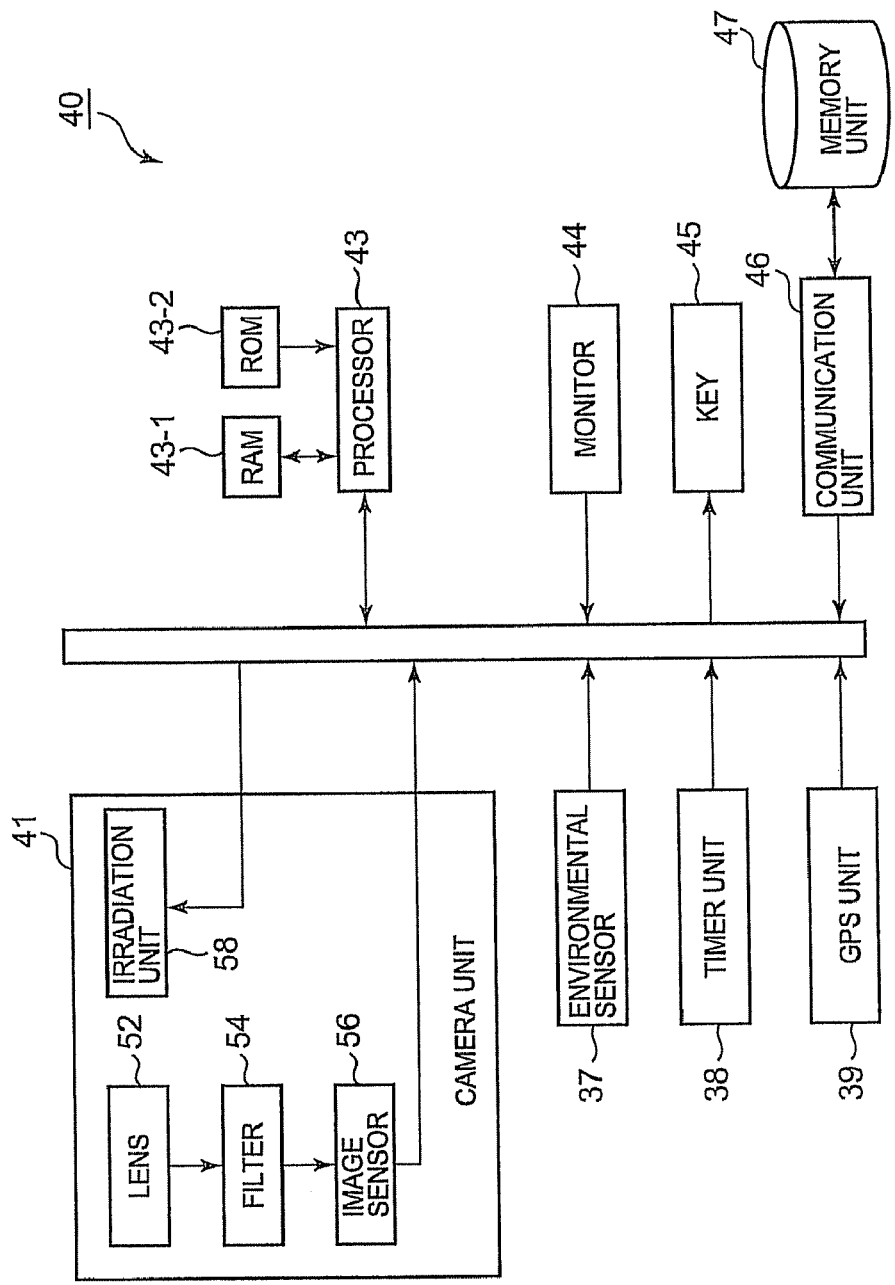
FIG. 5 illustrates a block diagram of an information processing apparatus 40 serving as the display apparatus 30.
Figure 6:
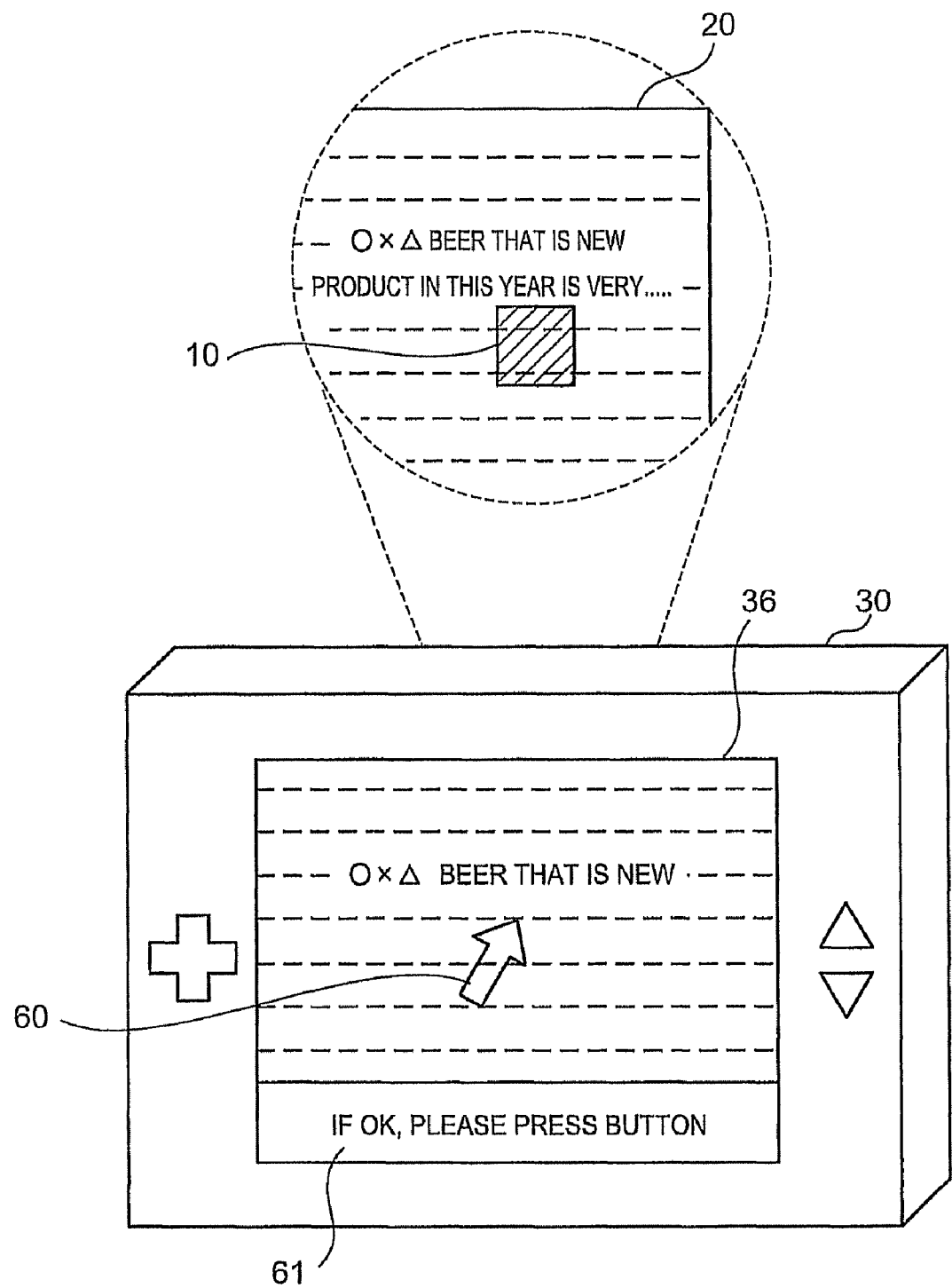
FIG. 6 illustrates the display unit 36 in the situation before displaying an advertisement when the display system 1 in accordance with the present embodiment is applied to the advertisement system.
Figure 7:
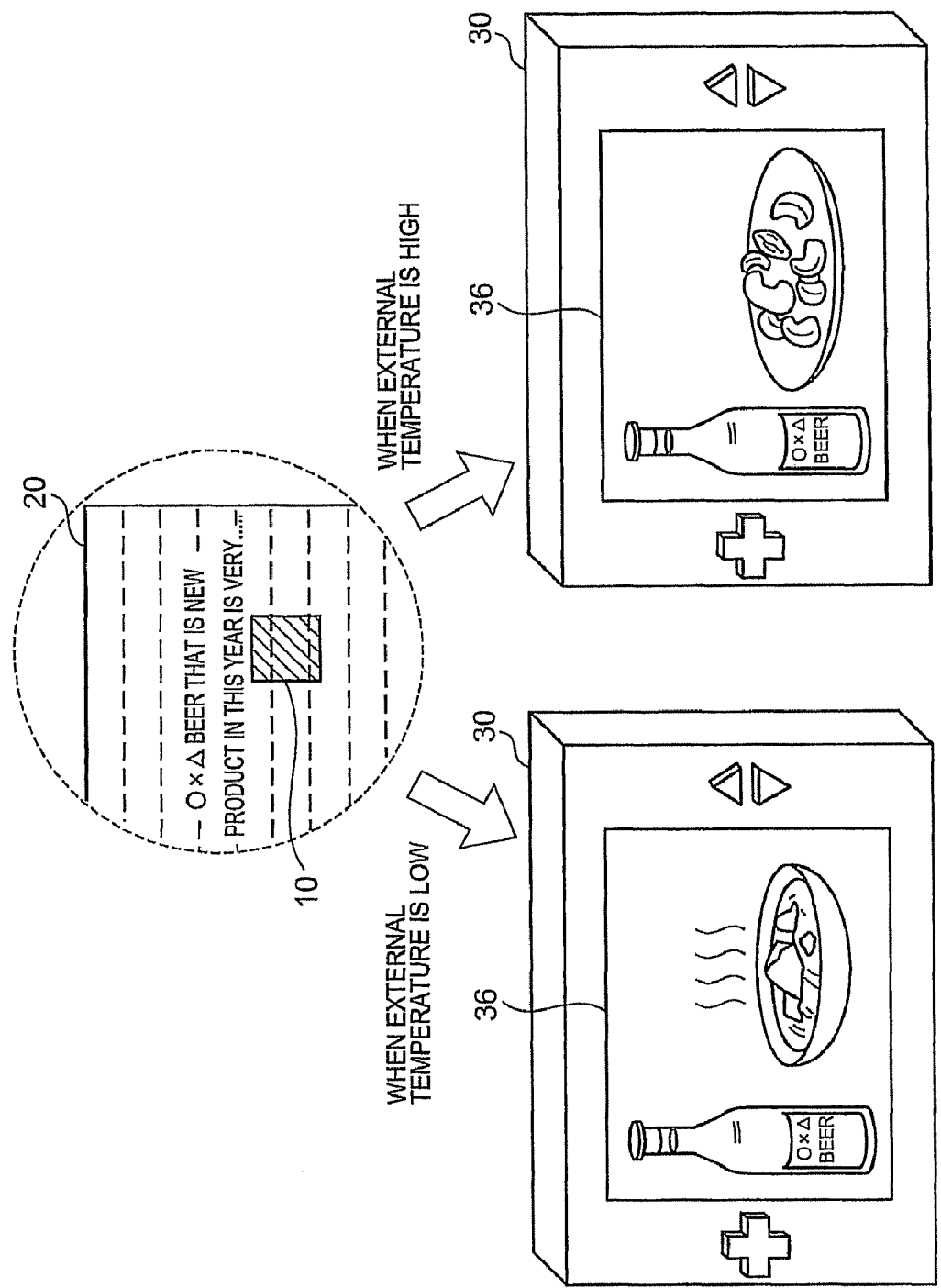
FIG. 7 illustrates the display unit 36 in the situation after displaying the advertisement when the display system 1 in accordance with the present embodiment is applied to the advertisement system.
Figure 8:
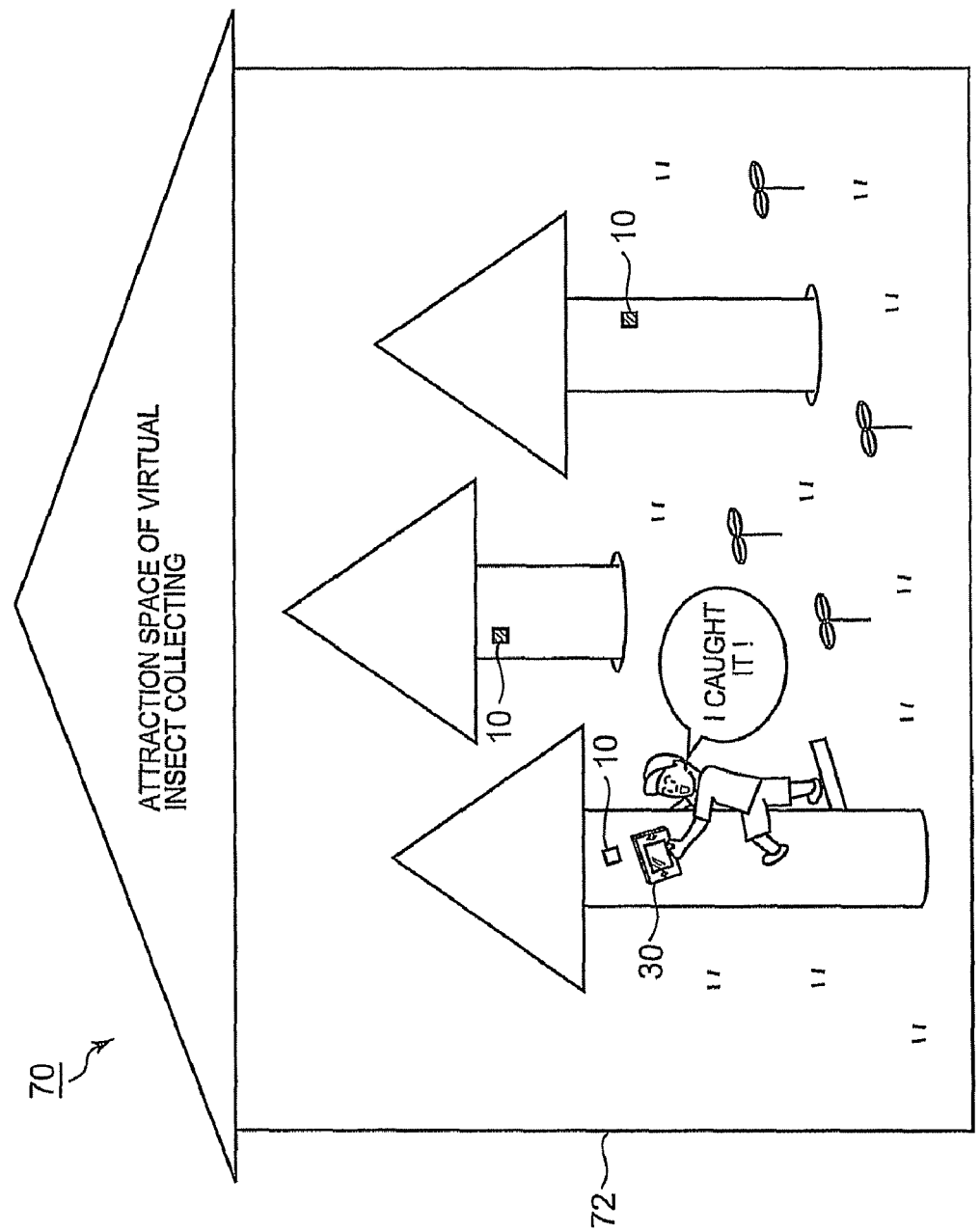
FIG. 8 illustrates a virtual insect collecting system 70 in accordance with the present embodiment.
Figure 9:
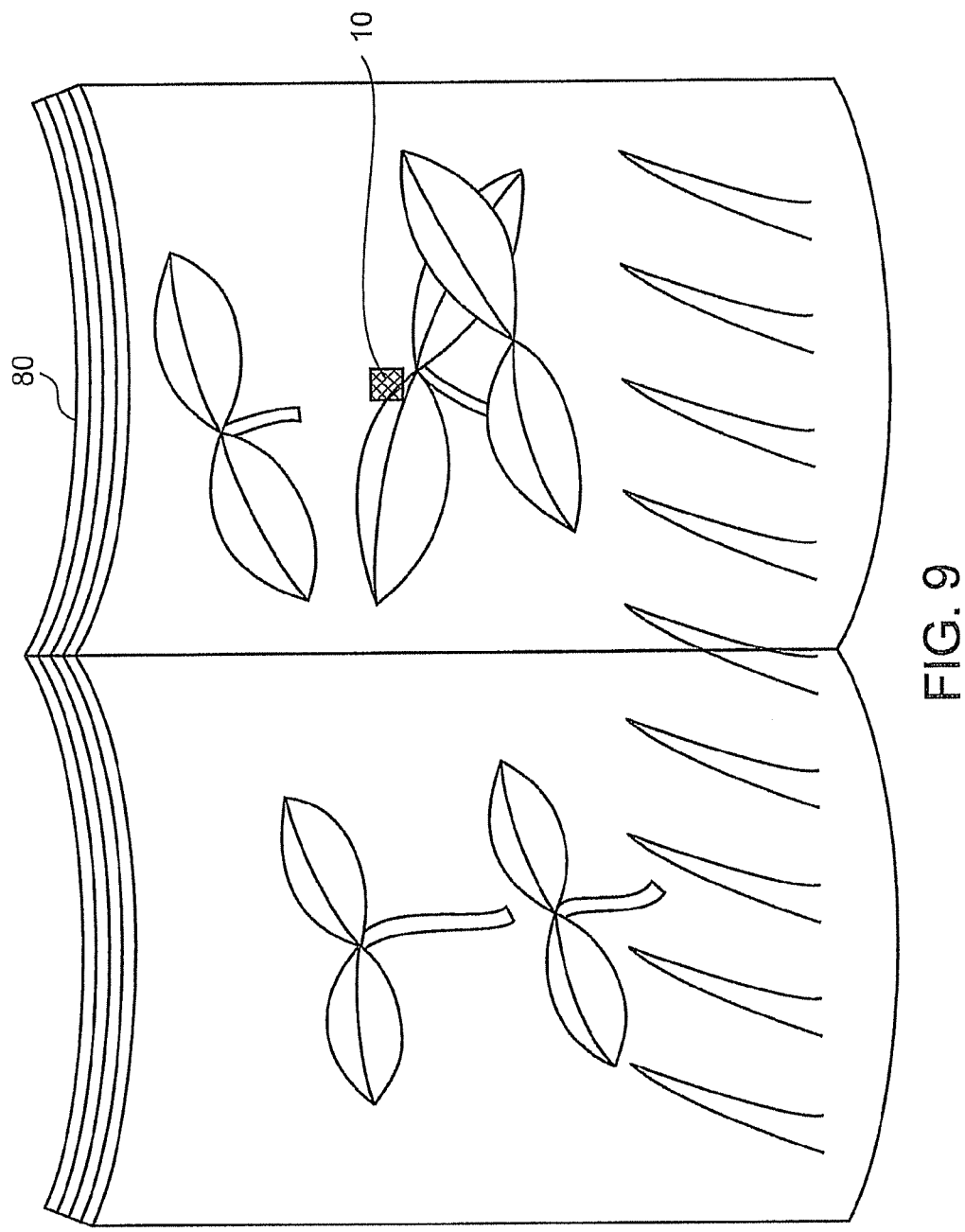
FIG. 9 illustrates a book 80 as a modification of the virtual insect collecting system 70.
Figure 10:
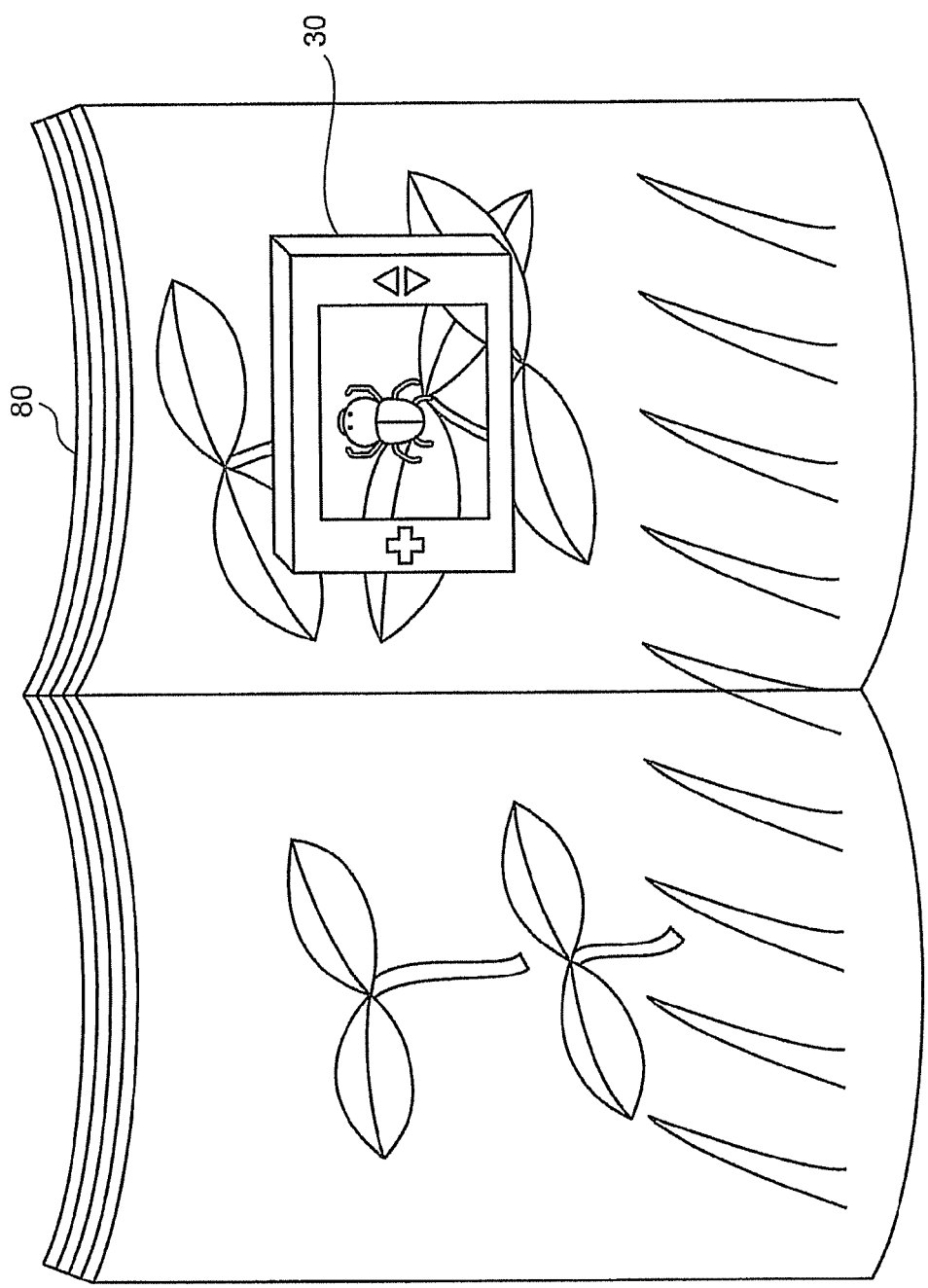
FIG. 10 illustrates the book 80 as the modification of the virtual insect collecting system 70, and the display apparatus 30 held up to the book 80.
Figure 11:
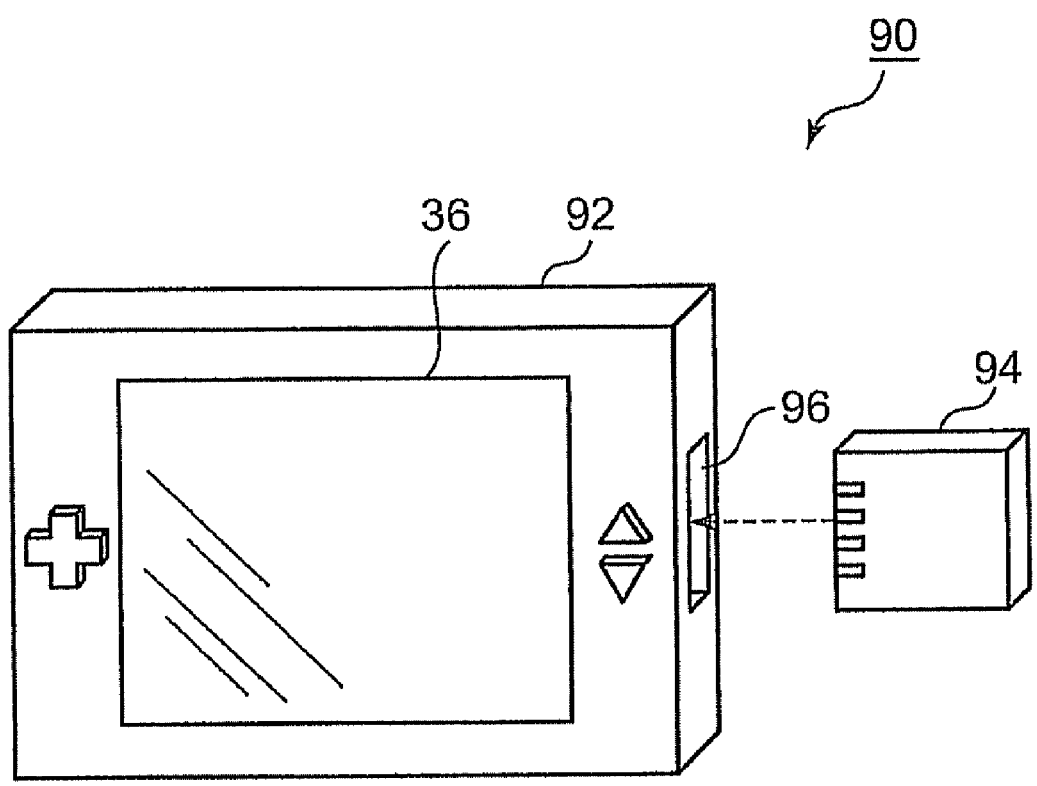
FIG. 11 illustrates an appearance of a display apparatus 90 in accordance with the modification of the present embodiment.
Figure 12:
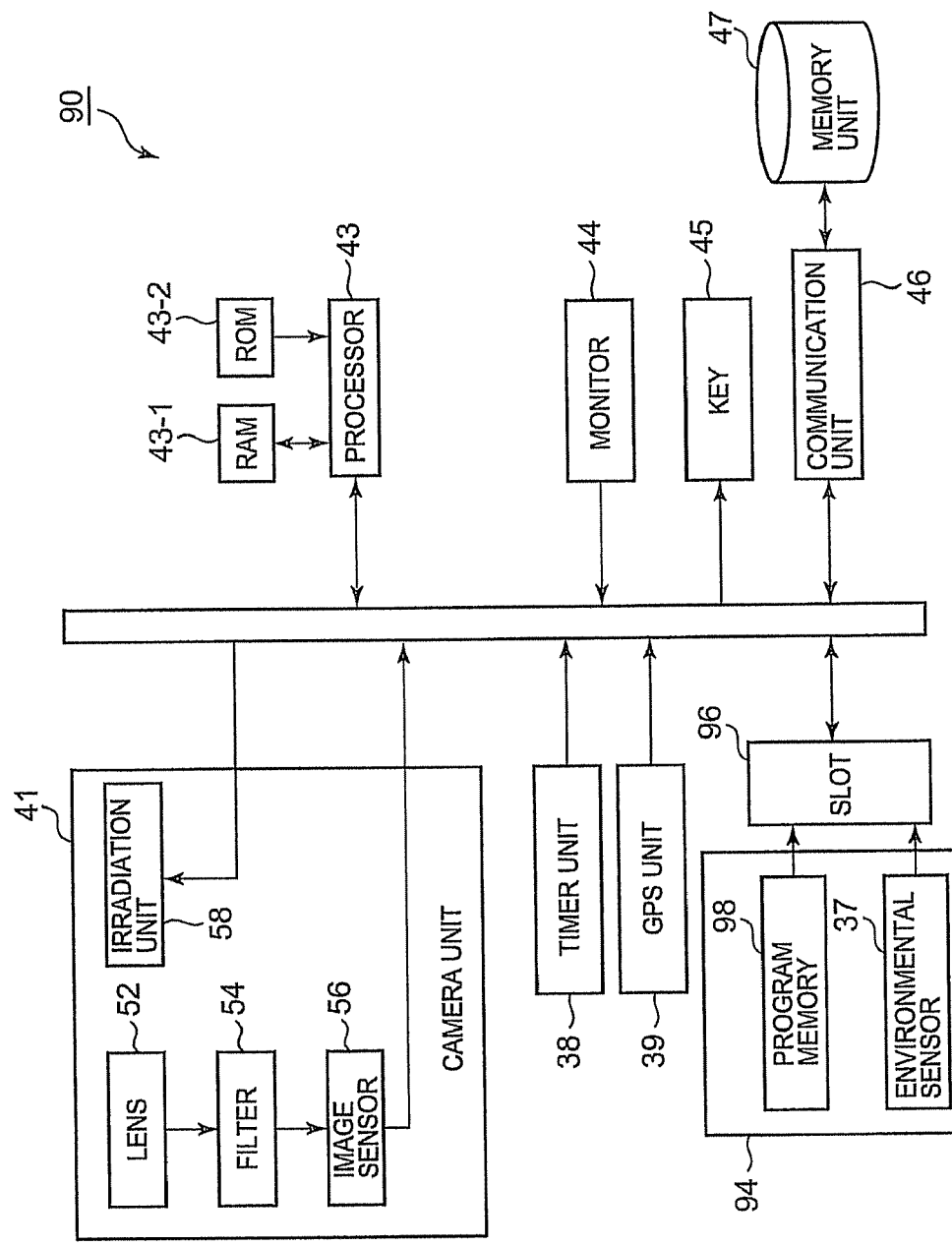
FIG. 12 illustrates a block diagram of the display apparatus 90 in accordance with the modification of the present embodiment.

1: Display system
10: Code image
20: Physical medium
30: Display apparatus
31: Shooting unit
32: Scanning unit
33: Acquisition unit
34: Decision unit
35: Database
36: Display unit
37: Environmental sensor
38: Timer unit
39: GPS unit
40: Information processing apparatus
41: Camera unit
42: Sensor
43: Processor
44: Monitor
45: Key
46: Communication unit
47: Memory unit
52: Lens
54: Filter
56: Image sensor
58: Irradiation unit
60: Pointer
61: Explanation character string
70: Virtual insect collecting system
72: Structure
80: Book
90: Display apparatus
92: Main body
94: External unit
96: Slot
98: Program memory

The invention claimed is:

1. A display method utilizing a display apparatus, said method comprising:

shooting a physical medium to generate a captured image from the physical medium;

scanning an image pattern on the physical medium, wherein the image pattern comprises an identification code and a plurality of binary indicators, wherein the identification code identifies a location on a storage medium of each image object of at least one image object, wherein each binary indicator of the plurality of binary indicators is associated with a corresponding status parameter of a plurality of status parameters, wherein each binary indicator has a positive value or a null value, and wherein the binary indicator of at least one status parameter of the plurality of status parameters has the positive value;

acquiring at least one status parameter value, said at least one status parameter value consisting of a status parameter value for each status parameter of the at least one status parameter whose binary indicator has the positive value;

generating a display object in dependence on the location appearing in the identification code and the acquired at least one status parameter value; and displaying, on a display unit of the display apparatus, the display object and the captured image in an overlapping relationship in which the display object overlaps the captured image.

2. The method of claim 1, wherein the at least one image object consists of a single image object, and wherein said generating the display object comprises:

identifying the single image object by utilizing the location of the single image object appearing in the identification code; and changing the identified single image object into the display object, wherein said changing is based on the acquired at least one status parameter value.

3. The method of claim 1, wherein the at least one image object is a plurality of image objects, wherein said generating the display object comprises:

selecting the image object from the plurality of image objects, wherein said selecting the image object is based on the location appearing in the identification code and the acquired at least one status parameter value; and generating the display object from the selected image object.

4. The method of claim 3, wherein generating the display object from the selected image object comprises changing the selected image object into the display object, and wherein said changing is based on the acquired at least one status parameter value.

5. The method of claim 3, wherein the image pattern on the physical medium further comprises a type of each image object of the plurality of image objects, and wherein said selecting the image object is further based on the type of each image object of the plurality of image objects.

6. The method of claim 1, wherein the plurality of status parameters comprises at least one status parameter pertaining to an external environment of the display apparatus, and wherein the binary indicator of each status parameter of the at least one status parameter pertaining to the external environment of the display apparatus has the positive value.

7. The method of claim 6, wherein the at least one status parameter pertaining to the external environment of the display apparatus whose binary indicator has the positive value is selected from the group consisting of a brightness around the display apparatus, a temperature outside the display apparatus, a humidity outside the display apparatus, a sound around the display apparatus, an atmospheric pressure around the display apparatus, and combinations thereof.

8. The method of claim 1, wherein a pertinent status parameter of the plurality of status parameters is an acceleration applied to the display apparatus, and wherein the pertinent status parameter has the positive value.

9. The method of claim 1, wherein a pertinent status parameter of the plurality of status parameters is an orientation of the display apparatus, and wherein the pertinent status parameter has the positive value.

10. The method of claim 1, wherein the method further comprises changing a motion of the display apparatus in dependence on the acquired at least one status parameter value.

11. The method of claim 1, wherein the method further comprises ascertaining that a size of the scanned image pattern is larger than a specified standard size, and wherein said acquiring is responsive to said ascertaining.

12. A display apparatus comprising a processor and a computer readable memory unit coupled to the processor, said memory unit containing instructions that when executed by the processor implement a display method, said method comprising:

shooting a physical medium to generate a captured image from the physical medium;

scanning an image pattern on the physical medium, wherein the image pattern comprises an identification code and a plurality of binary indicators, wherein the identification code identifies a location on a storage medium of each image object of at least one image object, wherein each binary indicator of the plurality of binary indicators is associated with a corresponding status parameter of a plurality of status parameters, wherein each binary indicator has a positive value or a null value, and wherein the binary indicator of at least one status parameter of the plurality of status parameters has the positive value;

acquiring at least one status parameter value, said at least one status parameter value consisting of a status parameter value for each status parameter of the at least one status parameter whose binary indicator has the positive value;

generating a display object in dependence on the location appearing in the identification code and the acquired at least one status parameter value; and displaying, on a display unit of the display apparatus, the display object and the captured image in an overlapping relationship in which the display object overlaps the captured image.

13. The display apparatus of claim 12, wherein the at least one image object consists of a single image object, and wherein said generating the display object comprises:

identifying the single image object by utilizing the location of the single image object appearing in the identification code; and changing the identified single image object into the display object, wherein said changing is based on the acquired at least one status parameter value.

14. The display apparatus of claim 12, wherein the at least one image object is a plurality of image objects, wherein said generating the display object comprises:

selecting the image object from the plurality of image objects, wherein said selecting the image object is based on the location appearing in the identification code and the acquired at least one status parameter value; and generating the display object from the selected image object.

15. The display apparatus of claim 14, wherein generating the display object from the selected image object comprises changing the selected image object into the display object, and wherein said changing is based on the acquired at least one status parameter value.

16. The display apparatus of claim 14, wherein the image pattern on the physical medium further comprises a type of each image object of the plurality of image objects, and wherein said selecting is further based on the type of each image object of the plurality of image objects.

17. The display apparatus of claim 12, wherein the plurality of status parameters comprises at least one status parameter pertaining to an external environment of the display apparatus, and wherein the binary indicator of each status parameter of the at least one status parameter pertaining to the external environment of the display apparatus has the positive value.

18. The display apparatus of claim 17, wherein the at least one status parameter pertaining to the external environment of the display apparatus whose binary indicator has the positive value is selected from the group consisting of a brightness around the display apparatus, a temperature outside the display apparatus, a humidity outside the display apparatus, a sound around the display apparatus, an atmospheric pressure around the display apparatus, and combinations thereof.

19. A program product, comprising a storage device having a computer readable program code stored therein and not being a signal, said computer readable program code containing instructions that when executed by a processor of a display apparatus implement a display method, said method comprising:

shooting a physical medium to generate a captured image from the physical medium;

scanning an image pattern on the physical medium, wherein the image pattern comprises an identification code and a plurality of binary indicators, wherein the identification code identifies a location on a storage medium of each image object of at least one image object, wherein each binary indicator of the plurality of binary indicators is associated with a corresponding status parameter of a plurality of status parameters, wherein each binary indicator has a positive value or a null value, and wherein the binary indicator of at least one status parameter of the plurality of status parameters has the positive value;

acquiring at least one status parameter value, said at least one status parameter value consisting of a status parameter value for each status parameter of the at least one status parameter whose binary indicator has the positive value;

generating a display object in dependence on the location appearing in the identification code and the acquired at least one status parameter value; and displaying, on a display unit of the display apparatus, the display object and the captured image in an overlapping relationship in which the display object overlaps the captured image.

20. The program product of claim 19, wherein the at least one image object consists of a single image object, and wherein said generating the display object comprises:

identifying the single image object by utilizing the location of the single image object appearing in the identification code; and changing the identified single image object into the display object, wherein said changing is based on the acquired at least one status parameter value.

21. The program product of claim 19, wherein the at least one image object is a plurality of image objects, wherein said generating the display object comprises:

selecting the image object from the plurality of image objects, wherein said selecting the image object is based on the location appearing in the identification code and the acquired at least one status parameter value; and generating the display object from the selected image object.

22. The program product of claim 21, wherein generating the display object from the selected image object comprises changing the selected image object into the display object, and wherein said changing is based on the acquired at least one status parameter value.

23. The program product of claim 21, wherein the image pattern on the physical medium further comprises a type of each image object of the plurality of image objects, and wherein said selecting is further based on the type of each image object of the plurality of image objects.

24. The program product of claim 21, wherein the plurality of status parameters comprises at least one status parameter pertaining to an external environment of the display apparatus, and wherein the binary indicator of each status parameter of the at least one status parameter pertaining to the external environment of the display apparatus has the positive value.

25. The program product of claim 24, wherein the at least one status parameter pertaining to the external environment of the display apparatus whose binary indicator has the positive value is selected from the group consisting of a brightness around the display apparatus, a temperature outside the display apparatus, a humidity outside the display apparatus, a sound around the display apparatus, an atmospheric pressure around the display apparatus, and combinations thereof.

\* \* \* \* \*